United States Patent [19]

Carlgren et al.

[11] Patent Number: 5,099,426

[45] Date of Patent: Mar. 24, 1992

[54] METHOD FOR USE OF MORPHOLOGICAL INFORMATION TO CROSS REFERENCE KEYWORDS USED FOR INFORMATION RETRIEVAL

[75] Inventors: Richard G. Carlgren, Gaithersburg, Md.; William D. Modlin, Boca Raton, Fla.

[73] Assignee: International Business Machines Corporation, Armonk, N.Y.

[21] Appl. No.: 299,181

[22] Filed: Jan. 19, 1989

[51] Int. Cl.⁵ .......................... G06F 15/38; G06G 7/60
[52] U.S. Cl. ................................................... 364/419
[58] Field of Search .................... 364/419, 200, 900

[56] References Cited

U.S. PATENT DOCUMENTS

| | | | |
|---|---|---|---|
| 4,270,182 | 5/1981 | Asija | 364/900 |
| 4,499,553 | 2/1985 | Dickinson et al. | 364/900 |
| 4,731,735 | 3/1988 | Borgendale et al. | 364/200 |
| 4,775,956 | 10/1988 | Kaji et al. | 364/900 |
| 4,862,408 | 8/1989 | Zamora | 364/900 |
| 4,972,349 | 11/1990 | Kleinbuger | 364/900 |

FOREIGN PATENT DOCUMENTS 1226369 9/1987 Canada .

*Primary Examiner*—Dale M. Shaw
*Assistant Examiner*—Andrew Bodendorf
*Attorney, Agent, or Firm*—John E. Hoel

[57] ABSTRACT

A data processing method is disclosed for storing and retrieving text. The storage part of the method includes the steps of compiling a vocabulary list of words occurring in the text and augmenting the vocabulary list with lemmas of the words in the text, as an augmented word list. It then continues with the steps of compiling a cross reference table relating the lemmas of the words to locations of the words in the text and storing the text, the augmented word list and the cross reference table.

The retrieval part of the method includes the steps of inputting a query word to access a portion of the stored text, searching the augmented vocabulary list using the query word as a search term, and accessing the cross reference table with a lemma of the query word to locate the portion of the stored text.

The resulting invention enables a faster performance for "fuzzy" searches of text in documents, while enabling the cross reference lists used in the retrieval process, to be compactly stored.

14 Claims, 10 Drawing Sheets

FIG. 2

HIGH FREQ. LIST 50

| | |
|---|---|
| 1 | 101 |
| 2 | 99 |
| 3 | 102 |
| ... | |
| 97 | |
| 98 | |

AUGMENTED WORD LIST 52

| WN | ORIG & LEMMAS |
|---|---|
| 99 | " . " |
| 100 | |
| 180 | "MORE" |
| 181 | "MUCH" |
| 217 | "SOME" |
| 227 | "THINK" |
| 228 | "THINKS" |
| 232 | "THOUGHT" |
| 250 | |

COMPRESSED TEXT 58

| LINE # | |
|---|---|
| 1 | |
| 2 | |
| 3 | |
| 4 | TOKENIZED TEXT |
| 5 | |
| ... | |
| 18 | |
| 19 | |

WORD NUM. / LEMMA NUM. LIST 54

| WN | LN |
|---|---|
| 103 | 104 |
| 108 | 107 |
| 180 | 181 |
| 180 | 217 |
| 228 | 227 |
| 232 | 227 |

LEMMA NUM. / TEXT LOCATION LIST 56

| LN | LOCATION(S) (e.g. LINE #) |
|---|---|
| 99 | 1, 4, 8, 9, 10, 13, 15, 19 |
| 102 | 7, 11, 16 |
| 104 | 3 |
| 181 | 2 |
| 217 | 2 |
| 227 | 2, 5 |

FIG. 4

| LEMMA | LINGUISTIC VARIANTS |
|---|---|
| ABILITY | ABILITIES, ABILITY'S |
| ADDRESS | ADDRESSED, ADDRESSING, ADDRESSES |
| BOOK | BOOKED, BOOKING, BOOK'S BOOKS |
| ENTERTAIN | ENTERTAINING, ENTERTAINS, ENTERTAINED |
| GENTLEMEN | GENTLEMAN |
| GIVE | GIVING, GIVES, GAVE |
| KING | KINGS |
| LIGHT | LIGHTS, LIGHTING, LIGHTED |
| MUCH | MORE |
| SOME | MORE |
| OPINION | OPINIONS |
| SENTIMENT | SENTIMENT |
| THINK | THINKS, THOUGHT, THINKING |

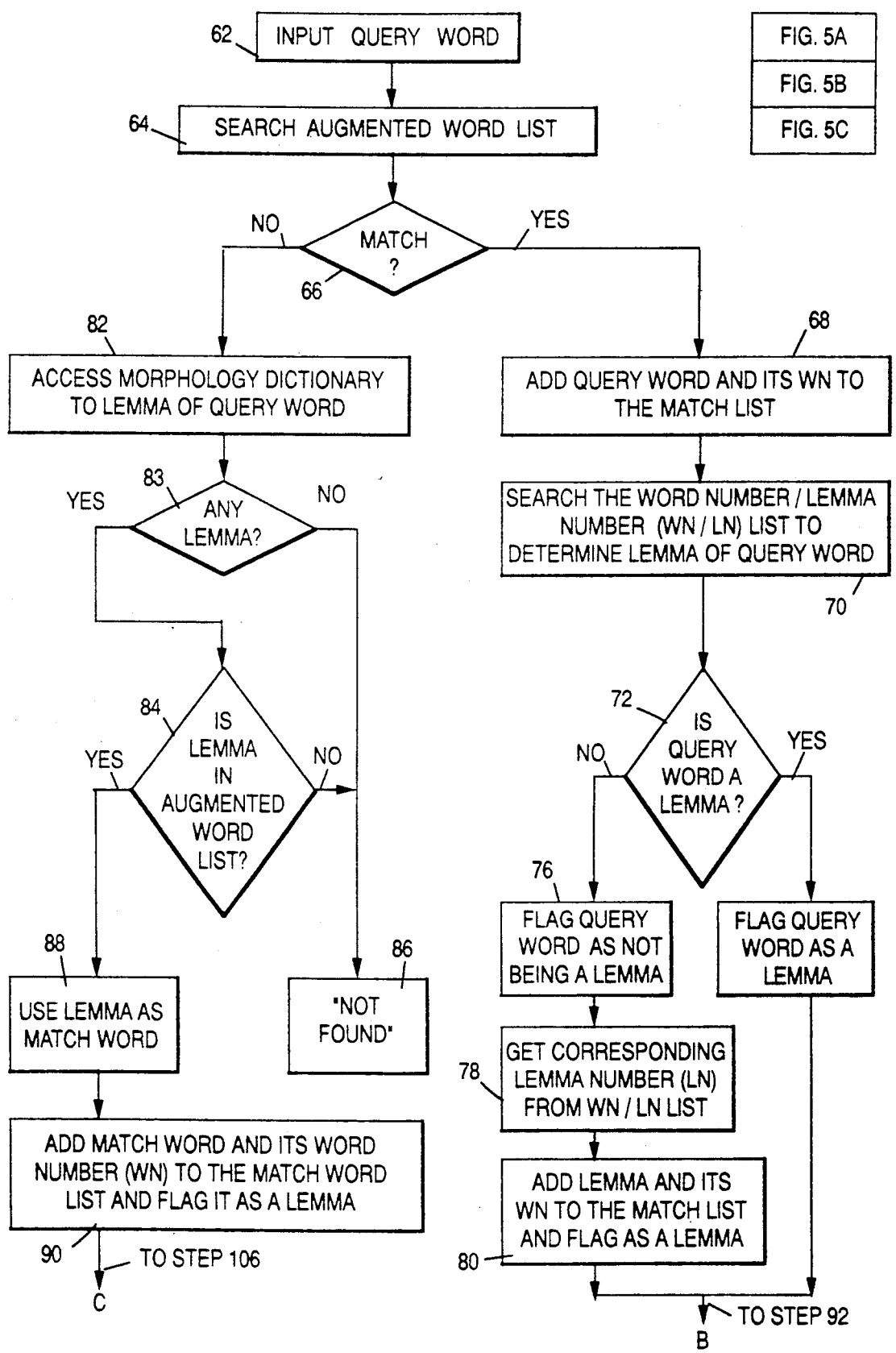

FIG. 6

| EXAMPLE 1 "MUCH" | MATCH LIST | | | |
|---|---|---|---|---|
| | WORD | WN | LEMMA | 100 |
| | MUCH | 181 | Y | |
| | MORE | 180 | N | |
| | SOME | 217 | Y | |

| EXAMPLE 2 "THINK" | MATCH LIST | | | |
|---|---|---|---|---|
| | WORD | WN | LEMMA | 100 |
| | THINK | 227 | Y | |
| | THINKS | 228 | N | |
| | THOUGHT | 232 | N | |

| EXAMPLE 3 "THINKING" | MATCH LIST | | | |
|---|---|---|---|---|
| | WORD | WN | LEMMA | 100 |
| | THINK | 227 | Y | |
| | THINKS | 228 | N | |
| | THOUGHT | 232 | N | |

| EXAMPLE 4 "THINKS" | MATCH LIST | | | |
|---|---|---|---|---|
| | WORD | WN | LEMMA | 100 |
| | THINK | 227 | Y | |
| | THINKS | 228 | N | |
| | THOUGHT | 232 | N | |

| EXAMPLE 5 "THOUGHTS" | MATCH LIST | | | |
|---|---|---|---|---|
| | WORD | WN | LEMMA | 100 |
| | THOUGHT | 232 | Y | |

| EXAMPLE 6 "SOME MEN THINK" | MATCH LIST (100) | | | LEMMA NUM/TEXT LOC LIST (56) | |
|---|---|---|---|---|---|
| | WORD | WN | LEMMA | LN | LOCATIONS |
| | SOME | 217 | Y | 217 | 2 |
| | MUCH | 181 | Y | 181 | 2 |
| | MORE | 180 | N | | |
| | MAN | 175 | Y | 175 | 2, 4 |
| | MEN | 178 | N | | |
| | THINK | 227 | Y | 227 | 2, 5 |
| | THINKS | 228 | N | | |
| | THOUGHT | 232 | N | | |

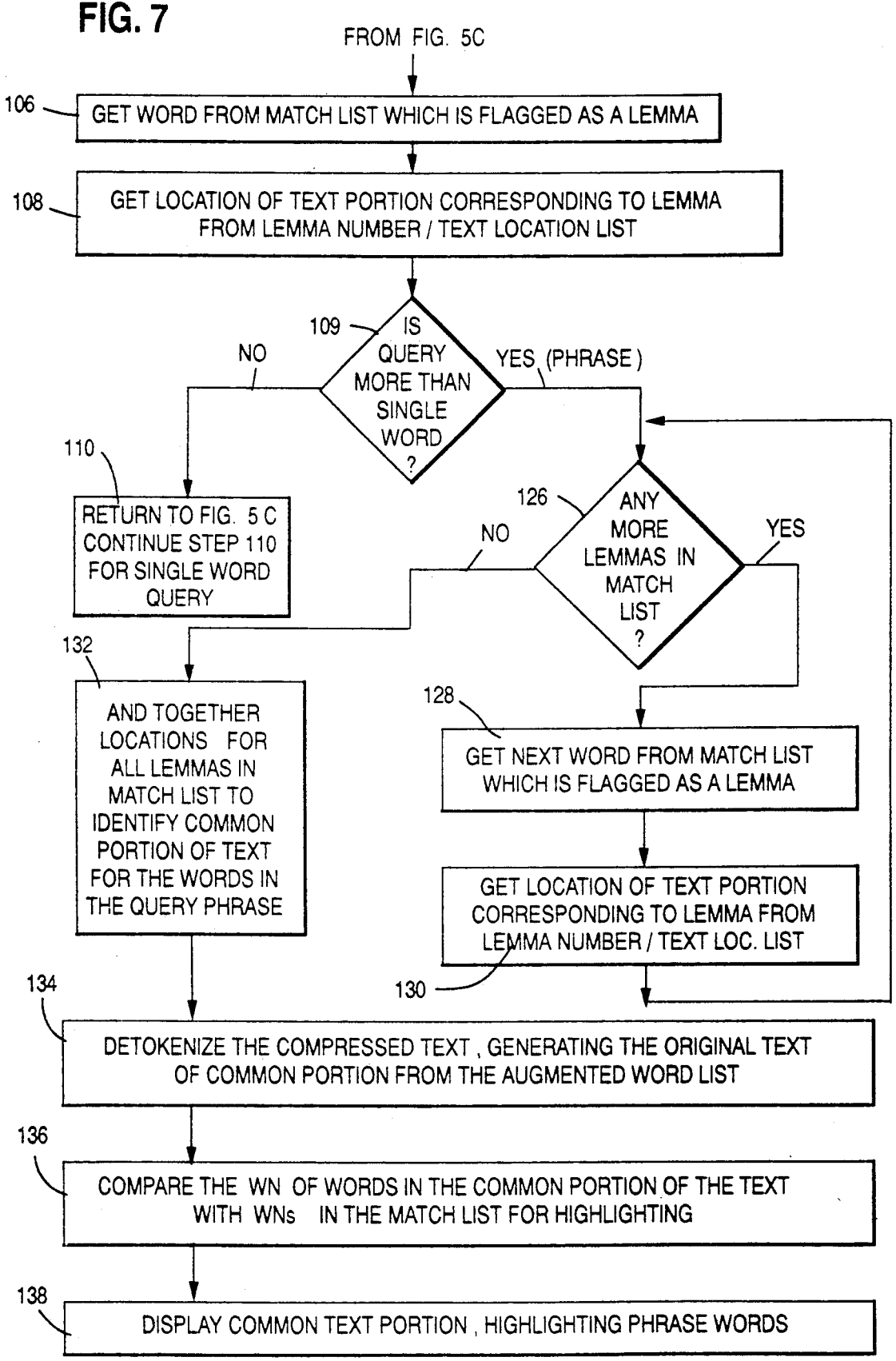

METHOD FOR USE OF MORPHOLOGICAL INFORMATION TO CROSS REFERENCE KEYWORDS USED FOR INFORMATION RETRIEVAL

BACKGROUND OF THE INVENTION

1. Technical Field

The invention disclosed herein broadly relates to data processing techniques, and more particularly relates to an improved method for creating key words in the process of document abstraction, and an improved method for relating query terms used in document retrieval to the key words derived during document abstraction. The invention is of use and value in any setting that requires key words to be related morphologically to one another. Such applications include, but are not exclusively, document retrieval and natural language interfaces to database management systems.

2. Background Art

The related application is "Paradigm-Based Morphological Text Analysis for Natural Languages" by A. Zamora, Ser. No. 028.437, filed Mar. 20, 1987, assigned to IBM Corporation. Reference is also made to U.S. Pat. No. 4,731,735 to K. W. Borgendale, et al., assigned to IBM Corporation, entitled "Multilingual Processing for Screen Image Build and Command Decode in a Word Processor, With Full Command, Message and Help Support," for its disclosure of a data processing system in which the invention disclosed herein can be executed.

The disclosure of the above cited patent applications is incorporated herein by reference to serve as a background for the invention disclosed herein.

For the last two decades the retrieval of documents using a computer has been a prominent application in both business and library science. Two methods of preparing and retrieving documents have become established in the state of the art. They are:

○ Keyword—At the time of document archival, operator intervention is required to attach to the document a set of terms that, in the opinion of the operator, describe the content/theme of the document being stored. The words or phrases may or may not occur within the document and represent a subjective judgment by the operator of how in the future the subject document may be queried.

○ Contextual—Prior to document archival, each word in the document is reviewed and based on a criterion or set of criteria, words and phrases are chosen as being retrieval terms for the subject document. In its simplest form, each word in the document can be viewed as a retrieval term. Alternatively, elaborate grammatical criteria can be used to scale down the selection of keywords to more specific words which, based on linguistic and information science methodology, are determined to have a greater level of specificity and of more use for later retrieval.

An example of a keyword based retrieval system is the current IBM PROFS system and an example of a contextual system is the current IBM STAIRS program product offering. For purposes of this invention, we do not differentiate between keywords derived by an operator or contextual references derived by some automatic criterion, being either empiric or linguistic or another method. In further discussion within this disclosure, no differentiation is made as to whether the keywords are related back to the document as an inverted file with pointers to the paragraph, line, and position within line or whether they are just associated with the document as an entity with no internal reference or pointers.

BACKGROUND OF THE INVENTION

From the earliest advent of automatic document storage, abstraction and retrieval, it has been realized that the computer mechanics of storing and associating words with a document were not the key factor in assuring the retrievability of a document once it had been archived. Works such as the Automatic Computing Machinery (ACM) Proceedings, March 1985 contain studies which indicate that the major factor in providing accuracy and reliability of retrieval relate to associating the keywords in the retrieval query with the actual keywords that were assigned to the document or automatically derived from the document. More specifically, problems such as synonymy or ambiguities created by inflection, can make a document unretrievable. That is, if the query contains a synonym of a keyword or if the keyword has some declension that is not identical to that found in the document, the query will not match the list of keywords and the document will not be found. Obviously, the low likelihood that a user will specifically remember the keywords down to their exact declension adds a reliability factor which greatly compromises the application of document retrieval. An example of this may be the word "BUILD." If this word has been associated with a document and the query contains the form "BUILT," then the query will fail to find the subject document using state-of-the-art technology. Alternatives have been offered in the literature such as partial masking; i.e., matching on a portion of a word such as BUILX for BUILT, BUILD, and BUILDING. This approach, however, is computationally tedious, can lead to ambiguities, and requires a level of operator sophistication and foresight. Analogous problems exist not only in the area of document retrieval, but also in accessing the data dictionaries related to database management, particularly when part of a natural language query system.

OBJECTS OF THE INVENTION

It is therefore an object of the invention to provide an improved information retrieval method for relating keywords that may differ based on declension.

It is a further object of the invention to provide an improved method for accessing text portions in document retrieval or general word processing applications, by using morphological means to map any word in a declension back to its lemma, which may then be used to access the text portion.

SUMMARY OF THE INVENTION

These and other objects, features and advantages are accomplished by the invention disclosed herein. A data processing method is disclosed for storing and retrieving text. The storage part of the method includes the steps of compiling a vocabulary list of words occurring in the text and augmenting the vocabulary list with lemmas of the words in the text, as an augmented word list. It then continues with the steps of compiling a cross reference table relating the lemmas of the words to locations of the words in the text and storing the text, the augmented word list and the cross reference table.

The retrieval part of the method includes the steps of inputting a query word to access a portion of the stored text. searching the augmented vocabulary list using the query word as a search term. and accessing the cross reference table with a lemma of the query word to locate the portion of the stored text.

Some more detailed steps of the retrieval part of the method include the steps of generating lemma variants of the lemma of the query word and generating other lemmas which have a variant the same as the lemma variants. The method then performs the steps of displaying the portion of the stored text located in the accessing step and highlighting the query word, the lemma variants, and the other lemmas where they appear in the portion of the stored text being displayed.

In an alternate embodiment of the invention. the method can accommodate queries comprised of a multiple word phrase, wherein the inputting step inputs at least a first and a second query words as a query phrase to access a desired portion of the stored text, the first query word occurring in a first plurality of portions of the stored text and the second query word occurring in a second plurality of portions of the stored text. The accessing step further comprises the steps of accessing the cross reference table with a first lemma of the first query word to locate the first plurality of portions of the stored text and accessing the cross reference table with a second lemma of the second query word to locate the second plurality of portions of the stored text. Then the method performs the steps of identifying a common portion of the stored text having a common location for the first plurality and the second plurality of portions of the stored text. displaying the common portion of the stored text as the desired portion. and highlighting the query phrase. where it appears in the common portion of the stored text being displayed.

The resulting invention enables a faster performance for "fuzzy" searches of text in documents. while enabling the cross reference lists used in the retrieval process. to be compactly stored.

BRIEF DESCRIPTION OF THE DRAWINGS

The foregoing and other advantages of the invention will be more fully appreciated with reference to the accompanying figures.

FIG. 2 depicts the parts of a compressed book file formed by the process of FIG. 1.

FIG. 4 illustrates an example morphology dictionary which is stored in the data processing system executing the method of FIG. 1 and FIG. 5

FIG. 5 is a block diagram showing the relationship of FIGS. 5A-5C to one another.

FIGS. 5A-5C are flow diagrams of the data processing method for the book reading process, in accordance with invention.

FIG. 6 illustrates the match word lists which are constructed during the book reading process.

FIG. 7 is a flow diagram of an alternate embodiment of the invention for processing queries which are multiple word phrases.

DESCRIPTION OF THE BEST MODE FOR CARRYING OUT THE INVENTION

Figure 1:
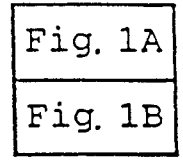
FIG. 1 is a block diagram showing the relationship of FIGS. 1A and 1B to one another.
Figure 1A:
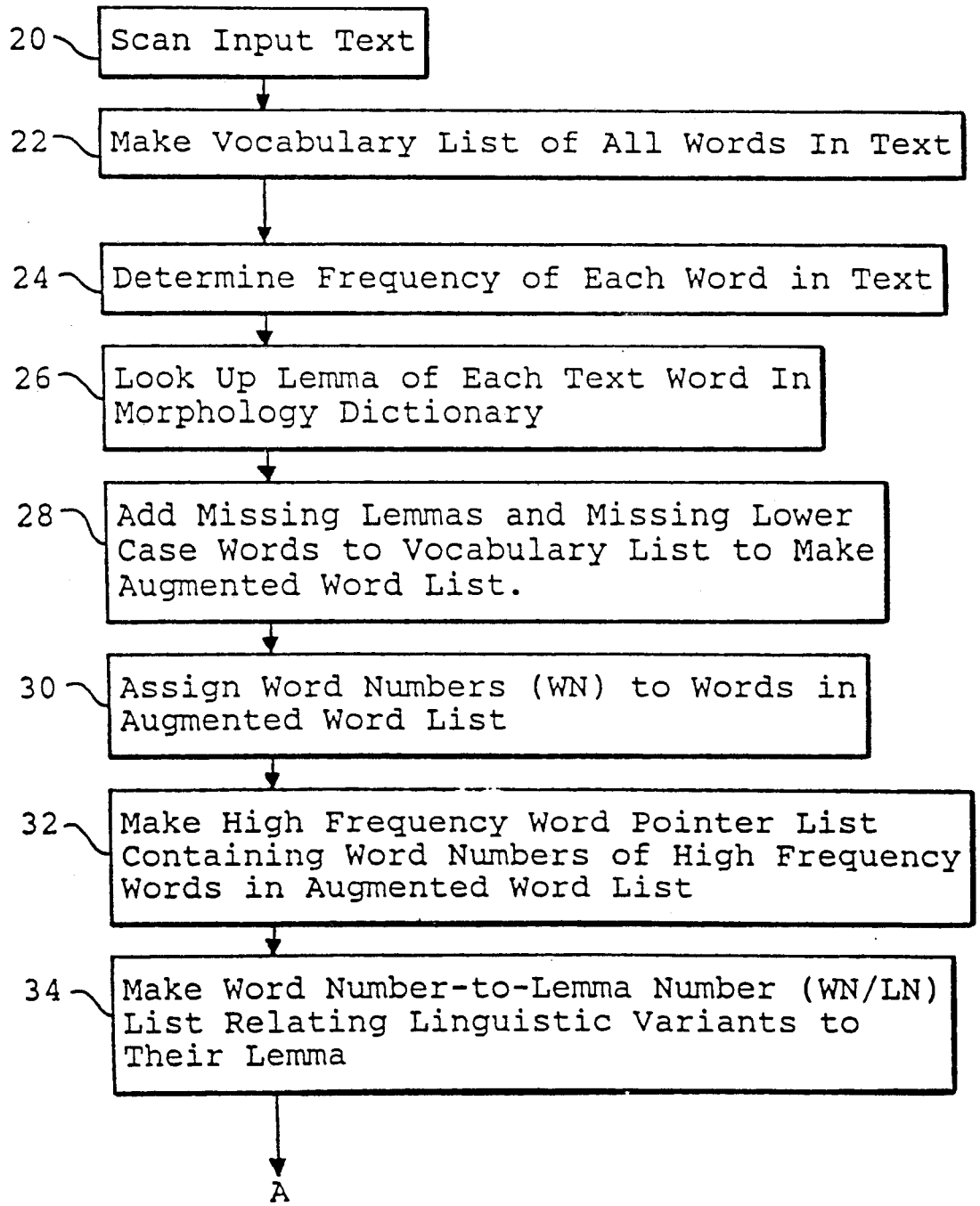
FIGS. 1A and 1B are flow diagrams of the data processing method for the book building process, in accordance with the invention.
Figure 1B:
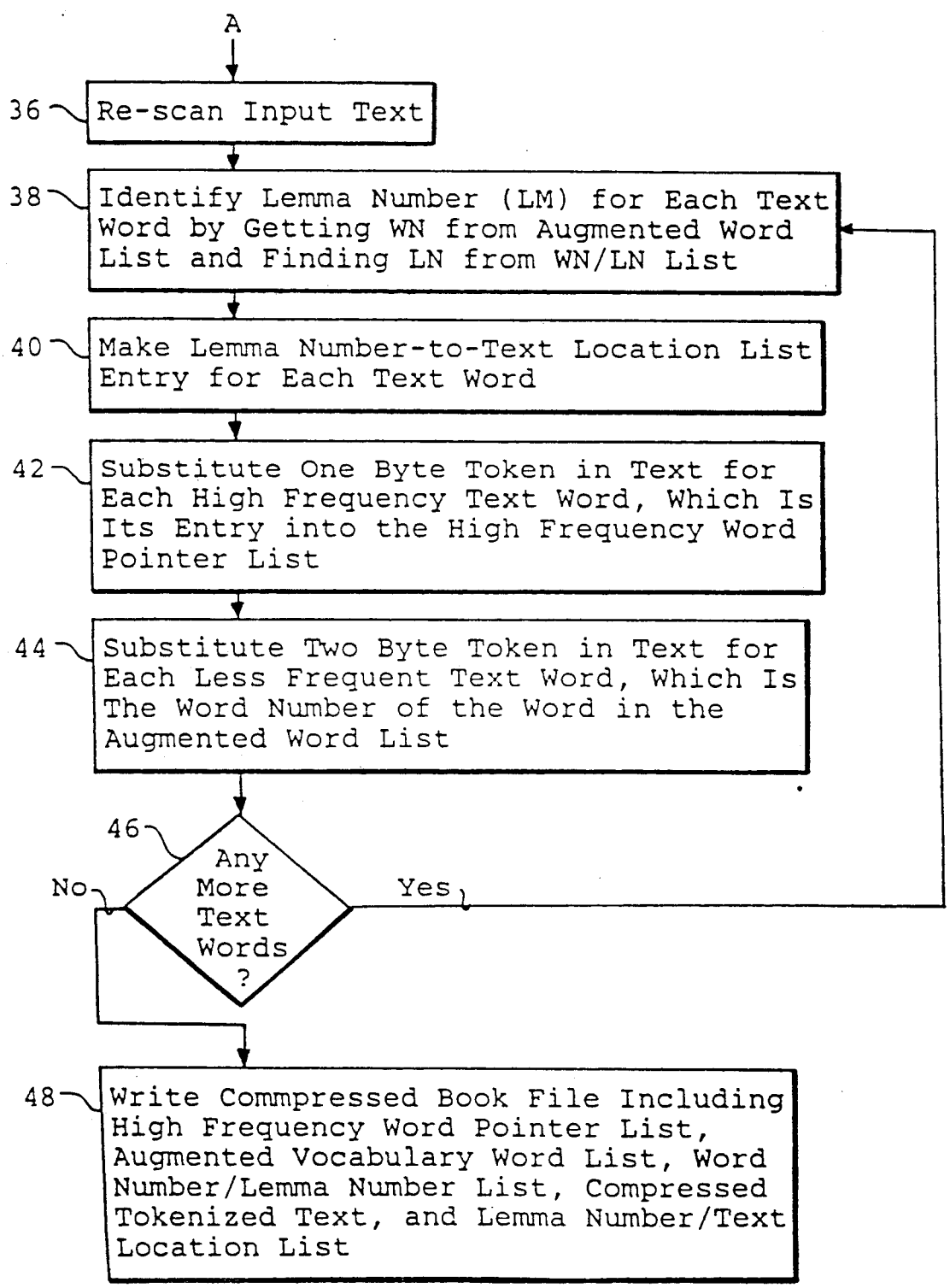

The embodiment of the invention includes the following steps.

Step 1—In a first step of the embodiment of this invention. the list of keywords which have been compiled as a document vocabulary list is reviewed automatically on a word-by-word basis to determine whether the lemma of each word in the list exists "a priori" in the list. The determination of the existence of the lemma is made by reference to a morphology dictionary which can be constructed by a method similar to that disclosed by A. Zamora in the previously cited copending patent application "Paradigm-Based Morphological Text Analysis for Natural Languages," Ser. No. 028,437, filed Mar. 20, 1987, assigned to IBM Corporation. If the lemma is present in the keyword list—i.e., which implies that the word occurred by itself in the list of keywords derived contextually from the document, then no action is taken. If a word in the keyword list is not a lemma. then its lemma is artificially generated from the morphology dictionary in this step and inserted in the keyword list. If a word, such as a surname, is not found in the morphology dictionary. then it is treated as if it were a lemma and added to the keyword list.

Step 2—The keyword list that has been so augmented in Step 1 is now reviewed against the original document prior to the completion of the archival. Each of the keywords in the original document is chained to the lemma of that keyword so that even though the lemma does not exist in the document. the occurrence of a declension of that lemma is identified as the lemma itself and the location of the declension in the document is assigned to the lemma in a cross reference table.

Step 3—Step 3 occurs when an operator is in the process of retrieving a document and has generated a query for its retrieval. It is assumed that the document has already been abstracted, that the keyword lists have been formed as in Steps 1 and 2, and that the document has been archived. At this point, the query words for retrieval are reviewed by the system. The query word is used as a search term to search the keyword list. If the query word is a lemma, then it is used to access the cross reference table to locate the portion of the document containing the query word. If the query word matches in the keyword list, but it is not a lemma, then its lemma is generated and is used to access the cross reference table. Additionally, if the query word does not match in the keyword list, then its lemma is found from the morphology dictionary, and that lemma is used to search the keyword list and to access the cross reference table. Hence, if a non-lemma word such as BUILT is used in the query, automatically the lemma of the query word would be generated in the form of the word BUILD and used as the search term. In a similar manner, but with slightly different objectives, if the query word is the word BUILDING, then the morphological referencing would achieve dual purposes by first indicating that the word BUILDING is in itself a lemma and in addition, pointing to the lemma from which BUILDING could have been derived—i.e., BUILD. Then both BUILDING and BUILD can be used as search terms. Alternately, it can be left up to grammatical analysis to determine which of these was intended in the query. The choice depends on the application of the actual language query. The use of the lemma of a query word as the search term enables faster performance for "fuzzy" searches.

In summary, the embodiment of this invention both acts on the document vocabulary list to insure that the lemma form of each vocabulary word is present and, similarly, it acts on the words in a query to ensure that the lemma form is generated for lookup. As a further application, once the lemma form exists in the query, it can also be used directly to access a synonym dictionary to provide additional extensions to the query based on synonymy.

The invention can best be illustrated in conjunction with a specific example of an original text which is to be compressed into a book file and then which is later to be queried, in accordance with the invention. The example of the original text is shown in Table 6 which is a portion of Patrick Henry's speech "Give Me Liberty or Give Me Death." Referring to the flow diagram of FIG. 1, the sequence of operational steps executed in a data processing system to convert the original text shown in Table 6 into a compressed book, begins with Step 20 which scans the input text represented by Table 6. The text of Table 6 can be a file input from a bulk storage disk or tape device, or from a communications link, or it can be sequentially input from a keyboard. Next, Step 22 makes a vocabulary list in the memory of the data processing system, of all the words in the text, and this can be seen in Table 2. Table 2 consists of the list of all the distinct words or strings, including punctuation, which is found in the original text of Table 6. The book building process of FIG. 1 continues by determining the frequency of occurrence of each unique word in the original text in Step 24. This step is performed in order to provide a more efficient compression of the words found in the original text, by assigning shorter tokens to those words which occur more frequently.

In accordance with the invention, the next step in FIG. 1 is to look up the lemma of each text word in a morphology dictionary stored in the data processing system, such as is shown in FIG. 4, this being accomplished in Step 26. The morphology dictionary contains most of the words in the English language, and shows the linguistic relationship between lemmas and their variants. A lemma of a word is the standard form of a word which is used in a language, generally the infinitive of a verb or the singular form of a noun. As can be seen in the morphology dictionary of FIG. 4, each lemma is associated with its linguistic variants. Lemma variants are words which are linguistically related to the lemma such as the various forms of a verb other than the infinitive, or the plural of a noun, for example. Lemmas and their linguistic variants are described more fully in the copending patent application by Zamora, referenced above.

The next step in FIG. 1 adds the missing lemmas in Step 28 to the vocabulary list in order to make the augmented word list 52 shown in FIG. 2. The augmented word list 52 is the list of all of the original words found in the original text of Table 6, plus the lemmas found in Step 26. The augmented word list corresponding to Table 6 is shown in Table 3. Step 26 also adds the lower case version for capitalized words which appear in the original text of Table 6. The lower case version of such words are added to the augmented word list 52. Each distinctive word or string is identified by a word number (WN). Note that the word "ADDRESS" exists in the augmented word list of Table 3 but that it did not occur in the source text as represented by the vocabulary list of Table 2. The word "ADDRESS" was added to the augmented word list of Table 3 as a result of obtaining from the morphology dictionary of FIG. 4, the word morphology data that the lemma for the word "ADDRESSED" is the word "ADDRESS." Similarly, the words "MUCH" and "SOME" were added to the augmented word list of Table 3 from the morphology dictionary of FIG. 4. The morphology dictionary of FIG. 4 can be a database co-resident in the same data processing system as is the building process of FIG. 1.

The book building process of FIG. 1 continues by assigning word numbers (WN) to the words in the augmented word list 52, as shown in Step 30.

Next, a high frequency word pointer list 50, shown in FIG. 2, is made, containing word numbers of the high frequency words which occur in the original text of Table 6. The pointer list contains the word numbers of the high frequency words as they are listed in the augmented word list 52. The high frequency list 50 contains word numbers representing where the text for the corresponding word can be found in the augmented vocabulary list 52. To compress the original text, the respective words in the original text of Table 6 are tokenized, that is they are represented by one byte or two byte representations. Tokenization of the words in the book is performed later in the book building process of FIG. 1, as will be described.

The next step in the book building process of FIG. 1 is Step 34 where a word number to lemma number list 54 is made which relates the linguistic variants to their lemma. An example of the word number to lemma number list (WN/LN) 54 is shown in Table 4 and is also depicted in FIG. 2. The word number to lemma number list 54 has two columns labeled WN which stands for the word number of a word in the augmented word list 52. The word number to lemma number list 54 also has a second column labeled LN which is the word number of the corresponding linguistic root (lemma) of that word. Words which are their own lemmas (for example "ACT") need no entry in the word number to lemma number list 54, see Table 4, but they do need an entry in the lemma number/text location list 56 of FIG. 2 and of Table 5, which will be described below. A word like "ABILITIES" would have an entry in the word number/lemma number list 54 referring to the word "ABILITY" as its lemma. A word like "MORE" would have multiple entries in the word number/lemma number list 54, one referring to its morphological lemma "MUCH" and another referring to its morphological lemma "SOME." In an alternate embodiment of the invention, the lemmas occurring in the original text of Table 6 can also be included in the WN/LN list 54, in which case a flag can also be included denoting that a word is also a lemma.

The book building process of FIG. 1 continues with Step 36 wherein the original text of Table 6 is re-scanned. During the re-scanning operation, Step 38 identifies the lemma number for each text word by getting the word number from the augmented word list 52 and finding the lemma number from the word number/lemma number list 54. (The lemma number is just the word number of the corresponding lemma for a linguistic variant.) The process then continues in Step 40 by making the lemma number to text location list 56 shown in FIG. 2 and also described in Table 5. There is a text location entry which is written into the list 56 for each text word found in the original text of Table 6. The lemma number/text location list 56 uses only lemma numbers (LN), that is word numbers for the lemmas which occur in the augmented vocabulary list 52, to indicate word locations in the original text of Table 6. This allows faster performance in searching for words, regardless of the grammatical form in which the words may occur.

The compression of the original text of Table 6 now takes place, which will result in the compressed text 58 of FIG. 2. This is performed beginning at Step 42 in FIG. 1, wherein a one byte token is substituted into the text for each high frequency text word, which occurred in the original text of Table 6. The one byte token is the entry into the high frequency word pointer list 50. The compression operation then continues with Step 44 of FIG. 1 wherein a two byte token is substituted into the text for less frequently occurring text words in the original text of Table 6. A two byte token is the word number of the word in the augmented word list 52. The high frequency list 50 consists of word numbers representing where the text for the corresponding word can be found in the augmented vocabulary list 52. In the example text of Table 6 there are 98 words which will occur in the high frequency list 50. If the word is found to be represented in the high frequency list 50, it is tokenized in the compressed text 58 as a one byte binary number, indicating the position in the high frequency list 50 to get the word number which is used to get the text of the word in the augmented vocabulary list 52. If the source text word is not represented by an entry in the high frequency list 50, it is tokenized with a two byte number, the first byte of which will be greater than the value 98, to distinguish it from the first 98 entries in the high frequency list 50. The two byte token is then used to directly locate the text of the word that it represents in the augmented vocabulary list 52.

Figure 3:
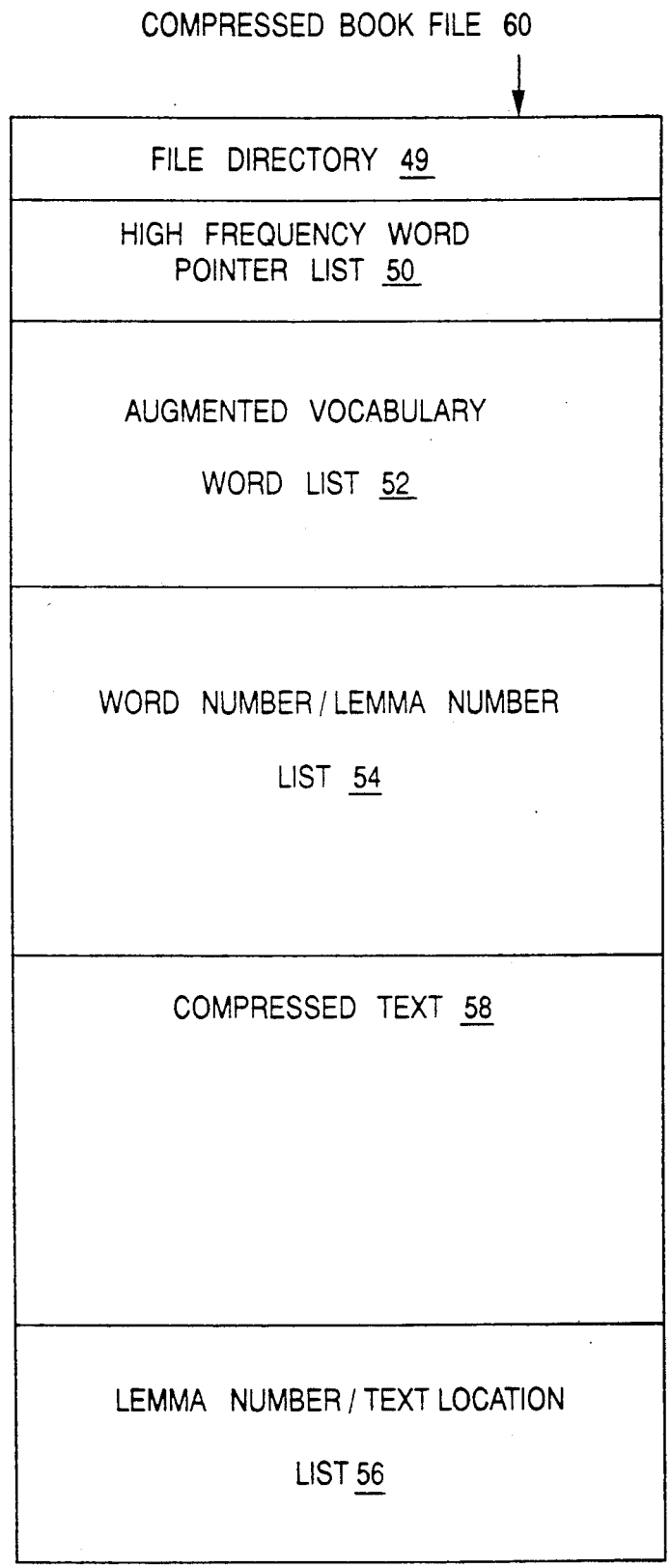
FIG. 3 depicts a compressed book file as a contiguous record, which is the product of the process of FIG. 1.

The process of FIG. 1 continues in Step 46 by determining whether there are any more text words in the original text of Table 6 to be processed. If there are, the process returns to Step 38. If there is not, then the process continues to Step 48 in which the compressed book file is written, as is schematically shown in FIG. 3. The compressed book file includes the high frequency word pointer list 50, the augmented vocabulary word list 52, the word number/lemma number list 54, the compressed (tokenized) text 58, and the lemma number/text location list 56. A file directory 49 can also be included, indicating where in the file 60 the various lists and compressed text begin. The compressed book file 60 can then be stored in bulk storage, it can be transmitted over a communications link to a remote location, or it can otherwise be saved and/or transmitted as a compact repository of the information which originally was presented by the original text of Table 6. To transmit the compressed book file 60, the steps begin with storing the file in a first buffer at a first location connected by means of a communications link to a second buffer located at a second location. Then transmitting the file from the first buffer at the first location over the communications link to the second buffer located at the second location. Then storing the file in the second buffer located at the second location. Then the retrieval steps would be carried out at the second location.

Figure 5B:
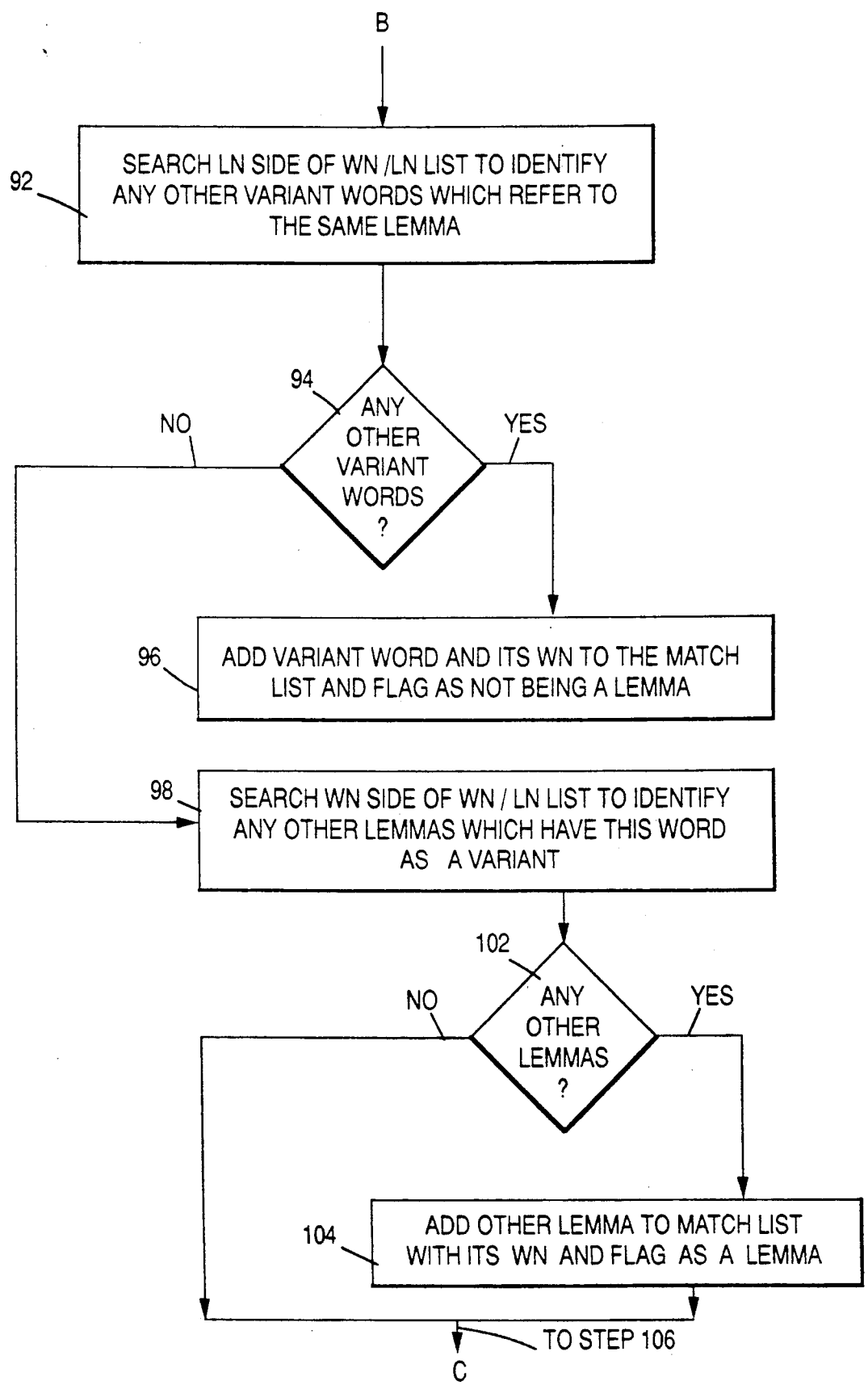
Figure 5C:
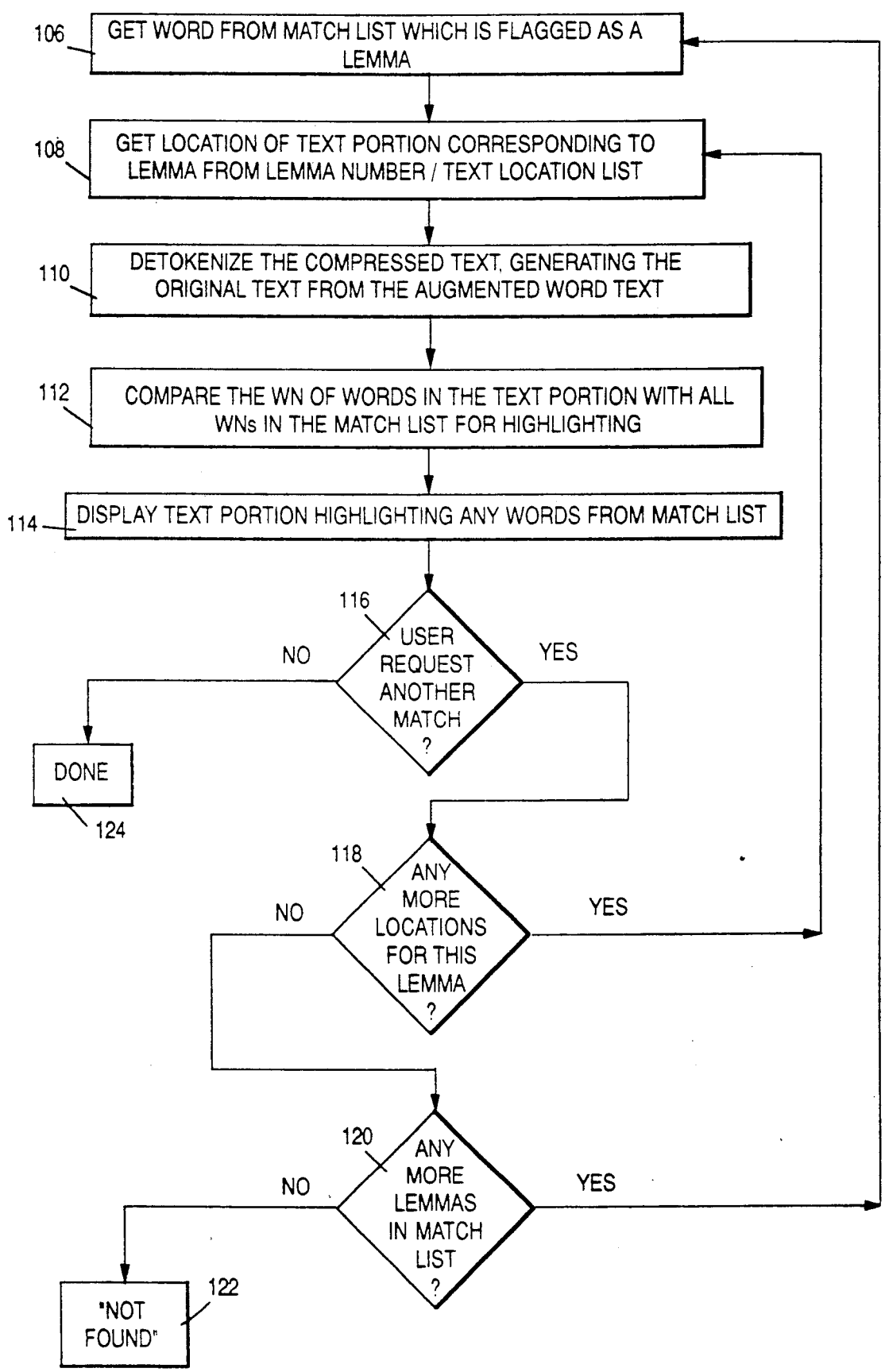

At a later time, when a user wishes to read the compressed book, and page to a particular portion of the book containing information which the user characterizes by a query expression, the book reading process of FIG. 5 is employed, in accordance with the invention. The process of FIG. 5 which is executed in a data processing system, starts by the user inputting a query word at Step 62 and indicating that he desires a "fuzzy" search to locate the portion or portions of the original text of Table 6 wherein that query word or related words can be found. The process of FIG. 5 then continues with Step 64 wherein the augmented vocabulary list 52 is searched using the input query word. In Step 66, if an exact match is found for the query word in the augmented vocabulary list 52, then in Step 68 the query word is added to a match word list 100, shown in FIG. 6, which is constructed during the book reading process. Along with the addition of the query word, its word number is added to the match word list 100, which was found during the course of the search of the augmented vocabulary list 52. The process then continues with Step 70 wherein the word number/lemma number list 54 is searched to determine the lemma of the query word. In this embodiment, list 54 is searched for the word number of the query word. If the entry is not present in the list 54, then the query word must also be a lemma. The process then continues to Step 72 to decide whether the query word is a lemma. If the query word is a lemma, then in Step 74, a flag is entered into the match word list 100 associated with the query word indicating that the query word is a lemma, and the process goes to Step 92. If instead, the query is found not to be a lemma in Step 72, then the binary flag entered in the match word list 100 in Step 76 indicates that it is not a lemma. In Step 78, the corresponding lemma number is accessed from the word number/lemma number list 54 and in Step 80, the lemma to the query word is then added, if necessary, to the match word list 100, along with its word number and a flag value which indicates that it is a lemma. The process then goes to Step 92.

If the match decision Step 66 indicates that the query word is not an exact match for any entry in the augmented vocabulary list 52, then the process goes to Step 82. In Step 82 of FIG. 5, the morphology dictionary of FIG. 4 is accessed to get the lemma of the query word. In example 3 of FIG. 6, if the query word were "THINKING," then the morphology dictionary of FIG. 4 would identify the word "THINK" as the lemma. If no lemma is found, then Step 83 exits to display "not found" in Step 86. If a lemma is found, then Step 83 transfers to Step 84 in which determination is made as to whether the lemma accessed from the morphology dictionary is in the augmented vocabulary word list 52. If it is not in the list 52, then in Step 86 an indication is made that the query word is "not found." Instead, if the lemma is in the augmented vocabulary word list 52, then Step 88 uses the lemma accessed from the morphology dictionary as the match word. In Step 90, the match word is added along with its word number to the match word list 100 and is flagged as a lemma. The process then transfer directly to Step 106, to avoid spurious search hits.

Steps 74 and 80 are directed to Step 92 of FIG. 5, wherein the lemma number (LN) side of the word number/lemma number list 54 is searched to identify whether there are any other variant words which refer to the same lemma. In Step 94, if there are other variants, then the process goes to Step 96 wherein the variant and its word number are added to the match list 100 along with the flag indicating it as a non-lemma. The process then goes to Step 98 wherein a search of the word number (WN) side of the word number/lemma number list 54 identifies any other lemmas which have this word as a variant. In Step 102, if there are other lemmas, then in Step 104 the other lemmas are also added to the match list 100 along with their word numbers.

In Step 94 if there are no other variants then the process goes to Step 98 to determine if the lemma from Step 74 or from Step 80 is, itself, a variant of any other lemma. In Step 102 if there are no other lemmas, then Step 102 flows along with the output of Step 104 to Step 106 which starts the process of identifying the locations of the fuzzy matches for the input query word. In Step 106, the first occurring word in the match word list 100 which is flagged as a lemma, is accessed. In Step 108, the location of the text portions in the original text of Table 6 which corresponds to the lemma are identified in the lemma/cross reference list 56. The original text of Table 6 can be divided up in a number of ways into portions. For the example of Table 6, the text has been divided up on a line-by-line basis so that the first line is considered line 1, the second line considered line 2, etc. and the last line is line 19. However, other aggregations of words in the original text could be chosen, such as a paragraph-by-paragraph partitioning, a word-by-word partitioning, or an arbitrary number of words per partition. Each such partition is referred to herein as a "portion" of the original text.

After the location of the text portion is identified corresponding to the lemma accessed from the match list 100, Step 110 detokenizes the compressed text 58, generating the original text of Table 6 from the augmented vocabulary list 52. Since each token found in the compressed text 58 is either a one byte token which points to the high frequency list 50, or alternately is a two byte token having an entry in the augmented vocabulary list 52, each consecutive token in the compressed text 58 can be converted into the corresponding original word which it represents, as it occurred in the original text of Table 6.

In order to highlight those words in the text portion being reconstructed, which are "fuzzy matched" with the query word, Step 112 of FIG. 5 compares the word number in the text portion with all of the word numbers in the match list 100. Where there is a positive comparison, the word in the reconstructed text is highlighted. In Step 114, the text portion being reconstructed is displayed, for example on a CRT monitor, with any words from the match list 100 being highlighted.

At this point the operator can determine whether the text portion being displayed meets his needs. In Step 116, the operator can request the next match if he so desires. If the next match is requested, then Step 118 determines whether there are any more locations for this particular lemma as may be indicated in the lemma number/text location list 56. If there are, then the process returns to Step 108. If there are not any more locations for this lemma, then the process goes to Step 120 where it is determined whether there are any more lemmas in the match list 100. If there are more lemmas in the match list 100, then the process goes to Step 106 and the next word in the match list which is flagged as a lemma, is accessed. However, if Step 120 determines that there are no more lemmas in the match list, then Step 122 indicates that no further text portions are found. Alternately, in Step 116, if the operator does not request a next match, then in Step 124 the process is done.

FIG. 6 indicates five different examples of single query words entered and the corresponding match word lists 100 which are formed. A match word list is formed during the reading process of FIG. 5, by tabulating the word number (WN) for each match word entry and its flag indicating whether it is lemma (Y) or not a lemma (N). In example 1, the query word is "MUCH" and the corresponding match word list consists of the words "MUCH," (WN=181, flag=Y) "MORE," (WN=180, flag=N) and "SOME" (WN=217, flag=Y). In example 2, the word "THINK" is a query word and the match word list contains the words "THINK," (WN=227, flag=Y) "THINKS," (WN=228, flag=N) and "THOUGHT" (WN=232, flag=N). In example 3, the query word "THINKING" results in the same match word list as example 2. In example 4, the query word "THINKS" results in the same match word list as example 2. In example 5, the query word "THOUGHTS" results in the match word list consisting of "THOUGHT" (WN=232, flag=Y).

For optimal compression of the lemma number/text location data in Table 5, the text locations indicated in Table 5 can be represented in several different ways, depending on the frequency of occurrence of the given word in the text of the original book. For words which do not appear frequently, they may be represented as a string of offsets, each offset being the distance in the text from the previous occurrence of the word. For those words which appear nearly every where in the source text, they may be represented as a string of offsets to text locations where the word does not occur. Otherwise, the text locations may be represented with a bit mask containing as many bits as there are text locations, where each bit which is "on" represents a text location where the word will be found.

The fact that the lemma number/text location list 56 indicates word lemma locations, allows for an optimal performance in searching for words, regardless of the grammatical form they may take in the book's source text. This also permits a significant reduction in the size of data needed to be stored in the compressed book file 60.

In an alternate embodiment of the invention, the query process of FIG. 5 can be adapted to handle multiple word, phrase queries. FIG. 7 is a flow diagram of the phrase query process, which is a modification of the flow diagram of FIG. 5. In FIG. 5, a multiple word, phrase query can be processed in a manner similar to a single word query, in that each word is consecutively applied at the input Step 62 and is processed in the same manner to assemble the lemmas for each word in the multiple word phrase, into the match list 100. In example 6 of FIG. 6, if the input phrase query is "SOME MEN THINK," then each consecutive word SOME, MEN and THINK, will be processed from Step 62 through Step 104 of the process of FIG. 5, to produce the match list 100 shown for example 6 in FIG. 6. The processing of a multiple word, phrase query departs from the single word query processing of FIG. 5, as is shown in FIG. 7. Step 106 and Step 108 of the phrase query flow diagram of FIG. 7 are the same as Steps 106 and 108 of the single word query processing shown in FIG. 5.

After Step 108 in FIG. 7, the phrase query flow diagram then proceeds to Step 109 where it is determined whether the query is more than a single word. If the query is not more than a single word, then the flow diagram of FIG. 7 proceeds back to Step 110 of FIG. 5, to continue the processing for a single word query.

Alternately, if Step 109 determines that the query is more than a single word, in other words a phrase, then the process of FIG. 7 proceeds to Step 126 to determine if there are any more lemmas in the match list 100. If there are more lemmas in the match list, then the process proceeds to Step 128 where the next word is accessed from the match list which is flagged as a lemma. The flow then proceeds to Step 130 where the location is obtained of the text portion corresponding to the lemma, from the lemma number/text location list 56. The flow then returns back to the input of Step 126 to determine if there are any more lemmas in the match list. If there are, then the process continues to get the next lemmas from the match list and to get their location of the text portions corresponding to those lemmas. After all of the lemmas have been gotten from the match list 100, then Step 126 will flow to Step 132.

The phrase query will contain at least a first and a second query words and it is the objective to locate the desired portion of the stored text where the phrase or its linguistic equivalent can be found. The first query word in the phrase may occur in several portions of the text which can be referred to here as a first plurality of portions. The second query word in the phrase may occur in still other portions of the text and these will be referred to here as a second plurality of portions. It is the objective in a phrase query processing to locate those portions of the text where both the linguistic equivalent of the first query word and the linguistic equivalent of the second query word can be found in common in a phrase. Steps 128 and 130 accessed the lemma number/text location list 56 to locate the first plurality of portions of the text which contained words linguistically equivalent to the first query word. Steps 128 and 130 also accessed the lemma number/text location list 56 to locate the second plurality of portions of the text which contain words which are linguistically equivalent to the second query word. It is now the object of Step 132 to identify a common portion of the stored text which has a common location for at least one of the first plurality of portions and for at least one of the second plurality of portions. It will be this common portion of the stored text which should be the desired portion containing the linguistic equivalent to the phrase query.

Referring now to example 6 in FIG. 6, the lemma number/text location list 56 is shown beside the match list 100 for example 6. In the lemma number/text location list 56, it can be seen that for a phrase query "SOME MEN THINK," the lemma "SOME" has a location pointer pointing to line 2 of the text of Table 6. The lemma "MUCH" has a location pointer pointing to line 2. The lemma "MAN" has location pointers pointing to line 2 and to line 4. The lemma "THINK" has location pointers pointing to line 2 and also to line 5. In Step 132 of the phrase query flow diagram of FIG. 7, the locations for all the lemmas in the match list 100 are logically ANDed together in order to identify the common portion or portions of the text for the words in the query phrase. In referring to FIG. 6, example 6, it can be seen that when the locations for each of the four lemmas are ANDed together, that only the location pointer pointing to line 2 is common to all four lemmas. Thus, in accordance with the invention, the linguistic equivalent to the input query phrase should be found at line 2 of the original text in Table 6. Inspecting Table 6 it can be seen that the phrase at line 2 is "MAN THINKS MORE." This is the linguistically equivalent phrase being sought by the phrase query process.

The process of FIG. 7 then flows from Step 132 to Step 134 which detokenizes the compressed text 58, generates the original text of the common portion which, in this example is line 2, from the augmented word list 52. Then in Step 136, the word numbers of the words in the common portion of the text are compared with the word numbers in the match list 100 for highlighting. Then in Step 138, the common text portion, line 2 in this example, is displayed on a CRT display, and the phrase words "MAN THINKS MORE" are highlighted.

Applications of the Invention

1. Applications of the invention include document retrieval systems of both a keyword and contextual nature. As described previously, the ability to find a document based on keyword really is compromised if we are not able to automatically include in the search word list grammatically variant forms of the input query words.

2. Another application is the ability to map a word back to its lemma which then is used for synonym dictionary access. This aspect of the technology and patent has brought a use far greater than just backward retrieval and encompasses general word processing applications. The objective is to take a keyword or a word in text and be able to determine all related synonyms. This is normally done by reference to a previously compiled work such as a synonym dictionary but requires the accessing of that dictionary by the master entries which are normally the lemma of a given word. In terms of document retrieval the keywords in the query after being mapped back to the lemma, can also then be used as keys into a synonym dictionary to find the appropriate synonyms and to search for those associated keywords which may actually be the keywords in the document and were not precisely recalled and used in the creation of the document retrieval query.

Although a specific embodiment of the invention has been disclosed, it will be understood by those having skill in the art that the foregoing and other changes can be made to the specific embodiment without departing from the spirit and the scope of the invention.

TABLE 1

| (word list relationships) |
| --- |
| UHF → HF word list table   HF word list |

| | | |
|---|---|---|
| ------ | | ------ ----> |
| \| 99 \| | ----------------> | \|˙ ˙ \| |
| \| 100 \| | ----------------> | \|˙; ˙ \| |
| \| 101 \| | ----------------> | \|˙, ˙ \| . |
| \| 102 \| | ----------------> | \|'a' \| |
| \| 103 \| | ----------------> | \|'abilities' \| |
| \| 105 \| | ----------- | \|'ability' \| |
| | ---------> | \|'above' \| |

TABLE 2

(UHF word list)
UHF → HF word list table

| HF word number | HF 'word' |
|---|---|
| 99 | '.' |
| 100 | '.' |
| 101 | '.' |
| 102 | 'a' |
| 103 | 'abilities' |
| 105 | 'above' |
| 106 | 'act' |
| 108 | 'addressed' |
| 109 | 'all' |
| 110 | 'an' |
| 111 | 'and' |
| 112 | 'arrive' |
| 113 | 'as' |
| 114 | 'at' |
| 115 | 'awful' |
| 116 | 'back' |
| 117 | 'be' |
| 118 | 'before' |
| 121 | 'can' |
| 122 | 'ceremony' |
| 123 | 'character' |
| 124 | 'consider' |
| 125 | 'country' |
| 126 | 'debate' |
| 127 | 'different' |
| 128 | 'disloyalty' |
| 129 | 'disrespectful' |
| 130 | 'do' |
| 131 | 'earthly' |
| 133 | 'entertaining' |
| 134 | 'fear' |
| 135 | 'for' |
| 137 | 'forth' |
| 138 | 'freedom' |
| 139 | 'freely' |
| 140 | 'fulfill' |
| 142 | 'gentlemen' |
| 144 | 'giving' |
| 147 | 'great' |
| 148 | 'guilty' |
| 149 | 'have' |
| 154 | 'highly' |
| 155 | 'hold' |
| 156 | 'hope' |
| 161 | 'if' |
| 162 | 'in' |
| 163 | 'is' |
| 164 | 'it' |
| 166 | 'just' |
| 167 | 'keep' |
| 169 | 'kings' |
| 170 | 'less' |
| 172 | 'lights' |
| 173 | 'magnitude' |
| 174 | 'majesty' |
| 175 | 'man' |
| 178 | 'men' |
| 179 | 'moment' |
| 180 | 'more' |
| 182 | 'my' |
| 183 | 'myself' |
| 188 | 'of' |
| 190 | 'often' |
| 194 | 'opinions' |
| 196 | 'or' |
| 198 | 'our' |
| 199 | 'own' |
| 200 | 'part' |
| 203 | 'patriotism' |
| 205 | 'question' |
| 208 | 'revere' |
| 209 | 'same' |
| 210 | 'see' |
| 218 | 'speak' |
| 219 | 'subject' |
| 221 | 'than' |
| 222 | 'that' |
| 223 | 'the' |

TABLE 2-continued

(UHF word list)
UHF → HF word list table

| HF word number | HF 'word' |
|---|---|
| 225 | 'theirs' |
| 226 | 'therefore' |
| 228 | 'thinks' |
| 229 | 'this' |
| 232 | 'thought' |
| 233 | 'through' |
| 234 | 'time' |
| 235 | 'to' |
| 236 | 'toward' |
| 237 | 'towards' |
| 238 | 'treason' |
| 239 | 'truth' |
| 240 | 'very' |
| 241 | 'way' |
| 242 | 'we' |
| 243 | 'well' |
| 244 | 'which' |
| 245 | 'who' |
| 246 | 'will' |
| 247 | 'without' |
| 248 | 'worthy' |
| 120 | 'But' |
| 136 | 'For' |
| 146 | 'God' |
| 151 | 'Heaven' |
| 153 | 'Henry' |
| 158 | 'House' |
| 160 | 'I' |
| 202 | 'Patrick' |
| 215 | 'Should' |

TABLE 3

(HF word list)

| Word-number (WN) | 'word' |
|---|---|
| 99 | '.' |
| 100 | '.' |
| 101 | '.' |
| 102 | 'a' |
| 103 | 'abilities' |
| 104 | 'ability' |
| 105 | 'above' |
| 106 | 'act' |
| 107 | 'address' |
| 108 | 'addressed' |
| 109 | 'all' |
| 110 | 'an' |
| 111 | 'and' |
| 112 | 'arrive' |
| 113 | 'as' |
| 114 | 'at' |
| 115 | 'awful' |
| 116 | 'back' |
| 117 | 'be' |
| 118 | 'before' |
| 119 | 'but' |
| 120 | 'But' |
| 121 | 'can' |
| 122 | 'ceremony' |
| 123 | 'character' |
| 124 | 'consider' |
| 125 | 'country' |
| 126 | 'debate' |
| 127 | 'different' |
| 128 | 'disloyalty' |
| 129 | 'disrespectful' |
| 130 | 'do' |
| 131 | 'earthly' |
| 132 | 'entertain' |
| 133 | 'entertaining' |
| 134 | 'fear' |
| 135 | 'for' |
| 136 | 'For' |
| 137 | 'forth' |
| 138 | 'freedom' |
| 139 | 'freely' |
| 140 | 'fulfill' |

TABLE 3-continued

(HF word list)

| Word-number (WN) | 'word' |
|---|---|
| 141 | 'gentleman' |
| 142 | 'gentlemen' |
| 143 | 'give' |
| 144 | 'giving' |
| 145 | 'god' |
| 146 | 'God' |
| 147 | 'great' |
| 148 | 'guilty' |
| 149 | 'have' |
| 150 | 'heaven' |
| 151 | 'Heaven' |
| 152 | 'henry' |
| 153 | 'Henry' |
| 154 | 'highly' |
| 155 | 'hold' |
| 156 | 'hope' |
| 157 | 'house' |
| 158 | 'House' |
| 159 | 'i' |
| 160 | 'I' |
| 161 | 'if' |
| 162 | 'in' |
| 163 | 'is' |
| 164 | 'it' |
| 165 | 'It' |
| 166 | 'just' |
| 167 | 'keep' |
| 168 | 'king' |
| 169 | 'kings' |
| 170 | 'less' |
| 171 | 'light' |
| 172 | 'lights' |
| 173 | 'magnitude' |
| 174 | 'majesty' |
| 175 | 'man' |
| 176 | 'march' |
| 177 | 'March' |
| 178 | 'men' |
| 179 | 'moment' |
| 180 | 'more' |
| 181 | 'much' |
| 182 | 'my' |
| 183 | 'myself' |
| 184 | 'no' |
| 185 | 'No' |
| 186 | 'not' |
| 187 | 'nothing' |
| 188 | 'of' |
| 189 | 'offense' |
| 190 | 'often' |
| 191 | 'one' |
| 192 | 'only' |
| 193 | 'opinion' |
| 194 | 'opinions' |
| 195 | 'opposite' |
| 196 | 'or' |
| 197 | 'ought' |
| 198 | 'our' |
| 199 | 'own' |
| 200 | 'part' |
| 201 | 'patrick' |
| 202 | 'Patrick' |
| 203 | 'patriotism' |
| 204 | 'proportion' |
| 205 | 'question' |
| 206 | 'reserve' |
| 207 | 'responsibility' |
| 208 | 'revere' |
| 209 | 'same' |
| 210 | 'see' |
| 211 | 'sentiment' |
| 212 | 'sentiments' |
| 213 | 'shall' |
| 214 | 'should' |
| 215 | 'Should' |
| 216 | 'slavery' |
| 217 | 'some' |
| 218 | 'speak' |
| 219 | 'subject' |

TABLE 3-continued

(HF word list)

| Word-number (WN) | 'word' |
|---|---|
| 220 | 'such' |
| 221 | 'than' |
| 222 | 'that' |
| 223 | 'the' |
| 224 | 'The' |
| 225 | 'theirs' |
| 226 | 'therefore' |
| 227 | 'think' |
| 228 | 'thinks' |
| 229 | 'this' |
| 230 | 'This' |
| 231 | 'those' |
| 232 | 'thought' |
| 233 | 'through' |
| 234 | 'time' |
| 235 | 'to' |
| 236 | 'toward' |
| 237 | 'towards' |
| 238 | 'treason' |
| 239 | 'truth' |
| 240 | 'very' |
| 241 | 'way' |
| 242 | 'we' |
| 243 | 'well' |
| 244 | 'which' |
| 245 | 'who' |
| 246 | 'will' |
| 247 | 'without' |
| 248 | 'worthy' |
| 249 | '1775' |
| 250 | '23' |

TABLE 4

(Work-number - Lemma-number Table)

| WN | LN |
|---|---|
| 103 | 104 |
| 108 | 107 |
| 180 | 181 |
| 180 | 217 |
| 228 | 227 |
| 232 | 227 |

TABLE 5

(Lemma Cross-Reference Data Table)

| LN | Locations in Source Text |
|---|---|
| 99 |                                                                                                                                       \| |
| 100 |                                         \| |
| 101 |                                                                                 \| |
| 102 |                                                         \| |
| 104 | \| |
| 105 |                                                           \| |
| 106 |                                                                                         \| |
| 107 |             \| |
| 109 |     \| |
| 110 |                                                                         \| |
| 181 |                                                           \| |

TABLE 5-continued

| 217 | |

TABLE 6
('LIBERTY SPEECH')

Patrick Henry, March 23, 1775.
No man thinks more highly than I do of the patriotism, as well as abilities, of the very worthy gentlemen who have just addressed the House. But different men often see the same subject in different lights; and therefore, I hope it will not be thought disrespectful to those gentlemen if, entertaining as I do opinions of a character very opposite to theirs, I shall speak forth my sentiments freely and without reserve. This is no time for ceremony. The question before the House is one of awful moment to this country. For my own part, I consider it as nothing less than a question of freedom or slavery; and in proportion to the magnitude of the subject ought to be the freedom of the debate. It is only in this way that we can hope to arrive at truth, and fulfill the great responsibility which we hold to God and our country. Should I keep back my opinions at such a time, through fear of giving offense, I should consider myself as guilty of treason towards my country, and of an act of disloyalty toward the majesty of Heaven, which I revere above all earthly kings.

What is claimed is:

1. A data processing method for building a compressed book file, comprising the steps of:
   inputting a word morphology dictionary into a data processor, said dictionary including a list of lemmas and linguistic variant words corresponding to said lemmas in said list;
   inputting a document text into said data processor;
   compiling a vocabulary list of each word in said document text in said data processor;
   looking up in said morphology dictionary, a lemma for each word from said document text, to identify missing lemmas from said vocabulary list;
   adding said missing lemmas to said vocabulary list to form an augmented word list;
   assigning word numbers (WN) to words in said augmented word list;
   compiling a word number - to - lemma number (WN/LN) list relating word numbers (WN) of words in said augmented word list to their corresponding lemmas, as represented by a lemma number (LN);
   identifying a lemma number (LN) for each word in said document text by obtaining a word number (WN) from said augmented word list and finding a corresponding LN from said WN/LN list;
   compiling a lemma number - to - text location list for a location of each word in said document text;
   substituting a corresponding token for each said word in said document text, forming a compressed tokenized text of said document text; and
   outputting a compressed book file including said augmented word list, said word number/lemma number list, said compressed tokenized text and said lemma number - to - text location list.

2. The method of claim 1, which further comprises the method of reading said compressed book file, comprising the steps of:
   inputting said compressed book file;
   inputting a query word;
   comparing said query word with said words in said augmented word list;
   adding said query word to a match list when said query word compares with a word in said augmented word list;
   searching said word number/lemma number list to identify a lemma number of a lemma of said query word;
   accessing said lemma of said query word from said augmented word list using said lemma number thereof and adding said lemma of said query word to said match list;
   accessing a text location value in said document from said lemma number - to - text location list using said lemma number;
   accessing a portion of said compressed tokenized text of said document text using said text location value, said portion including a location represented by said text location value;
   decompressing said portion of said compressed tokenized text, forming a corresponding portion of said document text;
   comparing said query word and said lemma of said query word with words in said corresponding portion of said document text and highlighting words in said corresponding portion which compare.

3. The method of claim 1, which further comprises the method of reading said compressed book file, comprising the steps of:
   inputting said word morphology dictionary into a data processor, said dictionary including a list of lemmas and linguistic variant words corresponding to said lemmas in said list;
   inputting said compressed book file;
   inputting a query word;
   comparing said query word with said words in said augmented word list;
   accessing a lemma of said query word form said word morphology dictionary using said query word;
   comparing said lemma of said query word with said words in said augmented word list;
   adding said lemma of said query word to a match list when said lemma of said query word compares with a word having a first word number in said augmented word list;
   accessing a text location value in said document from said lemma number - to - text location list using said first word number;
   accessing a portion of said compressed tokenized text of said document text using said text location value, said portion including location represented by said text location value;
   decompressing said portion of said compressed tokenized text, forming a corresponding portion of said document text;
   comparing said lemma of said query word with words in said corresponding portion of said document text and highlighting words in said corresponding portion which compare.

4. The method of claim 1, which further comprises the method of reading said compressed book file, comprising the steps of:
   inputting said compressed book file;
   inputting a query word;
   comparing said query word with said words in said augmented word list;
   adding said query word to a match list when said query word compares with a word in said augmented word list;

searching said word number/lemma number list to identify a lemma number of a lemma of said query word;

accessing said lemma of said query word from said augmented word list using said lemma number thereof and adding said lemma of said word to said match list;

searching said word number/lemma number list to identify a variant word number which has a corresponding lemma number equal to said lemma number of said lemma of said query word;

adding said variant word to said match list;

accessing a text location value in said document from said lemma number - to - text location list using said lemma number;

accessing a portion of said compressed tokenized text of said document text using said text location value, said portion including a location represented by said text location value;

decompressing said portion of said compressed tokenized text, forming a corresponding portion of said document text;

comparing said query word, said variant word and said lemma of said query word with words in said corresponding portion of said document text and highlighting words in said corresponding portion which compare.

5. The method of claim 1, which further comprises the method of reading said compressed book file, comprising the steps of:

inputting said compressed book file;

inputting a query word;

comparing said query word with said words in said augmented word list;

adding said query word to a match list when said query word compares with a word in said augmented word list;

searching said word number/lemma number list to identify a lemma number of a lemma of said query word;

accessing said lemma of said query word from said augmented word list using said lemma number thereof and adding said lemma of said query word to said match list;

searching said word number/lemma number list to identify a variant word number for a variant word, which has a corresponding lemma number equal to said lemma number of said lemma of said query word;

adding said variant word to said match list;

searching said word number/lemma number list to identify a second lemma which has a corresponding variant word with a word number equal to said variant word number;

adding said second lemma to said match list;

accessing a text location value in said document from said lemma number - to - text location list using said lemma number;

accessing a portion of said compressed tokenized text of said document text using said text location value, said portion including a location represented by said text location value;

decompressing said portion of said compressed tokenized text, forming a corresponding portion of said document text;

comparing said query word, said variant word, said lemma of said query word and said second lemma with words in said corresponding portion of said document text and highlighting words in said corresponding portion which compare.

6. A data processing method for building a compressed book file, comprising the steps of:

inputting a word morphology dictionary into a data processor, said dictionary including a list of lemmas and linguistic variant words corresponding to said lemmas in said list;

inputting a document text into said data processor;

compiling a vocabulary list of each word in said document text in said data processor;

determining a frequency of occurrence of each word in said document text;

looking up in said morphology dictionary, a lemma for each word from said document text, to identify missing lemmas from said vocabulary list;

adding said missing lemmas to said vocabulary list to form an augmented word list;

assigning word numbers (WN) to words in said augmented word list;

compiling a high frequency word pointer list containing entry numbers and corresponding word numbers of high frequency words in said augmented word list;

compiling a word number - to - lemma number (WN/LN) list relating word numbers (WN) of words in said augmented word list to their corresponding lemmas, as represented by a lemma number (LN);

identifying a lemma number (LN) for each word in said document text by obtaining a word number (WN) from said augmented word list and finding a corresponding LN from said WN/LN list;

compiling a lemma number - to - text location list for a location of each word in said document text;

substituting a corresponding one of said entry numbers for each said high frequency word in said document text and substituting a corresponding word number for each word of said document text which is not represented in said high frequency pointer list, forming a compressed tokenized text of said document text; and outputting a compressed book file including said high frequency word pointer list, said augmented word list, said word number/lemma number list, said compressed tokenized text and said lemma number - to - text location list.

7. The method of claim 6, which further comprises the method of reading said compressed book file, comprising the steps of:

inputting said compressed book file;

inputting a query word;

comparing said query word with said words in said augmented word list;

adding said query word to a match list when said query word compared with a word in said augmented word list;

searching said word number/lemma number list to identify a lemma number of a lemma of said query word;

accessing said lemma of said query word from said augmented word list using said lemma number thereof and adding said lemma of said query word to said match list;

accessing a text location value in said document from said lemma number - to - text location list using said lemma number;

accessing a portion of said compressed tokenized text of said document text using said text location value, said portion including location represented by said text location value;

decompressing said portion of said compressed tokenized text, forming a corresponding portion of said document text;

comparing said query word and said lemma of said query word with words in said corresponding portion of said document text and highlighting words in said corresponding portion which compare.

8. The method of claim 6, which further comprises the method of reading said compressed book file, comprising the steps of:

inputting said word morphology dictionary into a data processor, said dictionary including a list of lemmas and linguistic variant words corresponding to said lemmas in said list;

inputting said compressed book file;

inputting a query word;

comparing said query word with said words in said augmented word list;

accessing a lemma of said query word from said word morphology dictionary using said query word;

comparing said lemma of said query word with said words in said augmented word list;

adding said lemma of said query word to a match list when said lemma of said query word compares with a word having a first word number in said augmented word list;

accessing a text location value in said document from said lemma number - to - text location list using said first word number;

accessing a portion of said compressed tokenized text of said document text using said text location value, said portion including a location represented by said text location value;

decompressing said portion of said compressed tokenized text, forming a corresponding portion of said document text;

comparing said lemma of said query word with words in said corresponding portion of said document text and highlighting words in said corresponding portion which compare.

9. The method of claim 6, which further comprises the method of reading said compressed book file, comprising the steps of:

inputting said compressed book file;

inputting a query word;

comparing said query word with said words in said augmented word list;

adding said query word to a match list when said query word compares with a word in said augmented word list;

searching said word number/lemma number list to identify a lemma number of a lemma of said query word;

accessing said lemma of said query word from said augmented word list using said lemma number thereof and adding said lemma of said query word to said match list;

searching said word number/lemma number list to identify a variant word number which has a corresponding lemma number equal to said lemma number of said lemma of said query word;

adding said variant word to said match list;

accessing a text location value in said document from said lemma number - to - text location list using said lemma number;

accessing a portion of said compressed tokenized text of said document text using said text location value, said portion including a location represented by said text location value;

decompressing said portion of said compressed tokenized text, forming a corresponding portion of said document text;

comparing said query word, said variant word and said lemma of said query word with words in said corresponding portion of said document text and highlighting words in said corresponding portion which compare.

10. The method of claim 6, which further comprises the method of reading said compressed book file, comprising the steps of:

inputting said compressed book file;

inputting a query word;

comparing said query word with said words in said augmented word list;

adding said query word to a match list when said query word compares with a word in said augmented word list;

searching said word number/lemma number list to identify a lemma number of a lemma of said query word;

accessing said lemma of said query word from said augmented word list using said lemma number thereof and adding said lemma of said query word to said match list;

searching said word number/lemma number list to identify a variant word number for a variant word, which has a corresponding lemma number equal to said lemma number of said lemma of said query word;

adding said variant word to said match list;

searching said word number/lemma number list to identify a second lemma which has a corresponding variant word with a word number equal to said variant word number;

adding said second lemma to said match list;

accessing a text location value in said document from said lemma number - to - text location list using said lemma number;

accessing a portion of said compressed tokenized text of said document text using said text location value, said portion including a location represented by said text location value;

decompressing said portion of said compressed tokenized text, forming a corresponding portion of said document text;

comparing said query word, said variant word, said lemma of said query word and said second lemma with words in said corresponding portion of said document text and highlighting words in said corresponding portion which compare.

11. A data processing method for building and reading a compressed book file, comprising the steps of:

building a compressed book file comprising the steps of:

inputting a word morphology dictionary into a data processor, said dictionary including a list of lemmas and linguistic variant words corresponding to said lemmas in said list;

inputting a document text into said data processor;

compiling a vocabulary list of each word in said document text in said data processor;

looking up in said morphology dictionary, a lemma for each word from said document text, to identify missing lemmas from said vocabulary list;

adding said missing lemmas to said vocabulary list to form an augmented word list;

assigning word numbers (WN) to words in said augmented word list;

compiling a word number - to - lemma number (WN/LN) list relating word numbers (WN) of words in said augmented word list to their corresponding lemmas, as represented by a lemma number (LN);

identifying a lemma number (LN) for each word in said document text by obtaining a word number (WN) from said augment word list and finding a corresponding LN from said WN/LN list;

compiling a lemma number - to - text location list for a location of each word in said document text;

substituting a corresponding token for each said word in said document text, forming a compressed tokenized text of said document text;

outputting a compressed book file including said augmented word list, said word number/lemma number list, said compressed tokenized text and said lemma number - to - text location list;

reading said compressed book file, comprising the steps of:

inputting said compressed book file;

inputting a query word;

comparing said query word with said words in said augmented word list;

adding said query word to a match list when said query word compares with a word in said augmented word list;

searching said word number/lemma number list to identify a lemma number of a lemma of said query word;

accessing said lemma of said query word from said augmented word list using said lemma number thereof and adding said lemma of said query word to said match list;

accessing a text location value in said document from said lemma number - to - text location list using said lemma number;

accessing a portion of said compressed tokenized text of said document text using said text location value, said portion including a location represented by said text location value;

decompressing said portion of said compressed tokenized text, forming a corresponding portion of said document text;

comparing said query word and said lemma of said query word with words in said corresponding portion of said document text and highlighting words in said corresponding portion which compare.

12. A data processing method for building and reading a compressed book file, comprising the steps of:

building a compressed book file comprising the steps of:

inputting a word morphology dictionary into a data processor, said dictionary including a list of lemmas and linguistic variant words corresponding to said lemmas in said list;

inputting a document text into said data processor;

compiling a vocabulary list of each word in said document text in said data processor;

looking up in said morphology dictionary, a lemma for each word from said document text, to identify missing lemmas from said vocabulary list;

adding said missing lemmas to said vocabulary list to form an augmented word list;

assigning word numbers (WN) to words in said augmented word list;

compiling a word number - to - lemma number (WN/LN) list relating word numbers (WN) of words in said augmented word list to their corresponding lemmas, as represented by a lemma number (LN);

identifying a lemma number (LN) for each word in said document text by obtaining a word number (WN) from said augmented word list and finding a corresponding LN from said WN/LN list;

compiling a lemma number - to - text location list for a location of each word in said document text;

substituting a corresponding token for each said word in said document text, forming a compressed tokenized text of said document text;

outputting a compressed book file including said augmented word list, said word number/lemma number list, said compressed tokenized text and said lemma number - to - text location list;

reading said compressed book file, comprising the steps of:

inputting said word morphology dictionary into a data processor, said dictionary including a list of lemmas and linguistic variant words corresponding to said lemmas in said list;

inputting said compressed book file;

inputting a query word;

comparing said query word with said words in said augmented word list;

accessing a lemma of said query word from said word morphology dictionary using said query word;

comparing said lemma of said query word with said words in said augmented word list;

adding said lemma of said query word to a match list when said lemma of said query word compares with a word having a first word number in said augmented word list;

accessing a text location value in said document from said lemma number - to - text location list using said first word number;

accessing a portion of said compressed tokenized text of said document text using said text location value, said portion including a location represented by said text location value;

decompressing said portion of said compressed tokenized text, forming a corresponding portion of said document text;

comparing said lemma of said query word with words in said corresponding portion of said document text and highlighting words in said corresponding portion which compare.

13. A data processing method for building and reading a compressed book file, comprising the steps of:

building a compressed book file comprising the steps of:

inputting a word morphology dictionary into a data processor, said dictionary including a list of lemmas and linguistic variant words corresponding to said lemmas in said list;

inputting a document text into said data processor;

compiling a vocabulary list of each word in said document text in said data processor;

looking up in said morphology dictionary, a lemma for each word from said document text, to identify missing lemmas from said vocabulary list;

adding said missing lemmas to said vocabulary list to form an augmented word list;

assigning word numbers (WN) to words in said augmented word list;

compiling a word number - to - lemma number (WN/LN) list relating word numbers (WN) of words in said augmented word list to their corresponding lemmas, as represented by a lemma number (LN);

identifying a lemma number (LN) for each word in said document text by obtaining a word number (WN) from said augmented word list and finding a corresponding LN from said WN/LN list;

compiling a lemma number - to - text location list for a location of each word in said document text;

substituting a corresponding token for each said word in said document text, forming a compressed tokenized text of said document text;

outputting a compressed book file including said augmented word list, said word number/lemma number list, said compressed tokenized text and said lemma number - to - text location list;

reading said compressed book file, comprising the steps of:

inputting said compressed book file;

inputting a query word;

comparing said query word with said words in said augmented word list;

adding said query word to a match list when said query word compares with a word in said augmented word list;

searching said word number/lemma number list to identify a lemma number of a lemma of said query word;

accessing said lemma of said query word from said augmented word list using said lemma number thereof and adding said lemma of said query word to said match list;

searching said word number/lemma number list to identify a variant word number which has a corresponding lemma number equal to said lemma number of said lemma of said query word;

adding said variant word to said match list;

accessing a text location value in said document from said lemma number - to - text location list using said lemma number;

accessing a portion of said compressed tokenized text of said document text using said text location value, said portion including a location represented by said text location value;

decompressing said portion of said compressed tokenized text, forming a corresponding portion of said document text;

comparing said query word, said variant word and said lemma of said query word with words in said corresponding portion of said document text and highlighting words in said corresponding portion which compare.

14. A data processing method for building and reading a compressed book file, comprising the steps of:

building a compressed book file comprising the steps of:

inputting a word morphology dictionary into a data processor, said dictionary including a list of lemmas and linguistic variant words corresponding to said lemmas in said list;

inputting a document text into said data processor;

compiling a vocabulary list of each word in said document text in said data processor;

looking up in said morphology dictionary, a lemma for each word from said document text, to identify missing lemmas from said vocabulary list;

adding said missing lemmas to said vocabulary list to form an augmented word list;

assigning word numbers (WN) to words in said augmented word list;

compiling a word number - to - lemma number (WN/LN) list relating word numbers (WN) of words in said augmented word list to their corresponding lemmas, as represented by a lemma number (LN);

identifying a lemma number (LN) for each word in said document text by obtaining a word number (WN) from said augmented word list and finding a corresponding LN from said WN/LN list;

compiling a lemma number - to - text location list for a location of each word in said document text;

substituting a corresponding token for each said word in said document text, forming a compressed tokenized text of said document text;

outputting a compressed book file including said augmented word list, said word number/lemma number list, said compressed tokenized text and said lemma number - to - text location list;

reading said compressed book file, comprising the steps of:

inputting said compressed book file;

inputting a query word;

comparing said query word with said words in said augmented word list;

adding said query word to a match list when said query word compares with a word in said augmented word list;

searching said word number/lemma number list to identify a lemma number of a lemma of said query word;

accessing said lemma of said query word from said augmented word list using said lemma number thereof and adding said lemma of said query word to said match list;

searching said word number/lemma number list to identify a variant word number for a variant word, which has a corresponding lemma number equal to said lemma number of said lemma of said query word;

adding said variant word to said match list;

searching said word number/lemma number list to identify a second lemma which has a corresponding variant word with a word number equal to said variant word number;

adding said second lemma to said match list;

accessing a text location value in said document from said lemma number - to - text location list using said lemma number;

accessing a portion of said compressed tokenized text of said document text using said text location value, said portion including a location represented by said text location value;

decompressing said portion of said compressed tokenized text, forming a corresponding portion of said document text;

comparing said query word, said variant word, said lemma of said query word and said second lemma with words in said corresponding portion of said document text and highlighting words in said corresponding portion which compare.

* * * * *